H. H. GARVER & G. F. BISSELL.
FOOT POWER WELDING DEVICE.
APPLICATION FILED MAR. 2, 1909.
942,444.
Patented Dec. 7, 1909.
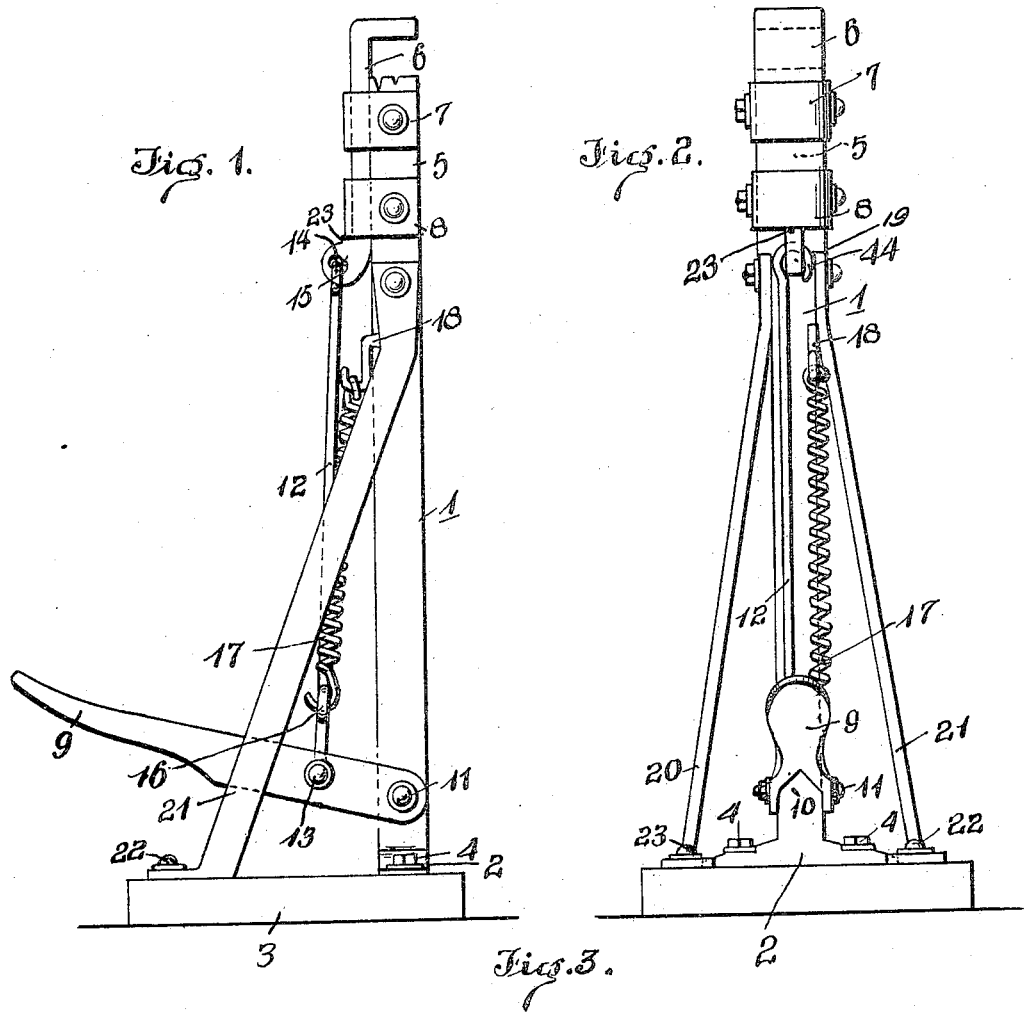
Witnesses
Ernest Crocker
M. DeGrange
Inventors
H. H. Garver,
G. F. Bissell.
By D. Swift 76.
Attorneys

UNITED STATES PATENT OFFICE.

HENRY HAMPTON GARVER AND GUY FRANKLIN BISSELL, OF GRANT CITY, MISSOURI.

FOOT-POWER WELDING DEVICE.

942,444. Specification of Letters Patent. Patented Dec. 7, 1909.

Application filed March 2, 1909. Serial No. 480,966.

*To all whom it may concern:*

Be it known that we, HENRY H. GARVER and GUY F. BISSELL, citizens of the United States, residing at Grant City, in the county of Worth and State of Missouri, have invented a new and useful Foot-Power Welding Device; and we do hereby declare the following to be a full, clear, and exact description of the invention, such as will enable others skilled in the art to which it appertains to make and use the same.

The invention relates to a foot power welding device, and has for its object to provide a device of this character adapted for the use of welding iron and metals together in an easy and efficient way by the power of foot pressure.

While this invention is adapted for welding various kinds of devices together, it is designed especially for the use of welding calks to horse-shoes.

With these and other objects in view, the invention consists in the construction and novel arrangement of parts hereinafter described and shown, and particularly pointed out in the appended claim.

In the drawings, Figure 1 is a side elevation of a foot power welding device constructed in accordance with this invention. Fig. 2 is a similar view taken at right angle to Fig. 1. Fig. 3 is a plan view of the treadle.

Referring to the drawings, 1 designates a standard the base 2 of which is T-shaped and is connected to a support 3 by means of screw-threaded bolts 4. The upper part of the standard 1 has an enlargement or head 5 which coöperates with a movable head 6. The head 5 is provided with upper and lower yokes 7 and 8 which hold the movable head in engagement with the stationary head. The standard 1 is provided with a lever 9 having a bifurcation 10 into which bifurcation the standard is mounted, the lever being pivotally connected thereto by a pivot rod 11. Also mounted within said bifurcation is a link 12 pivotally connected to said lever by a pivot rod 13, which link is provided with a hooked portion 14 which pivotally engages an aperture 15 in the lower part of the movable head. Also pivotally mounted within the bifurcation 10 is a pivoted hook 16 which connects with a spring 17, which spring is connected with a rigid member 18 mounted in a recess 19 of the standard 1. The recess 19 is wedged shaped which has the effect of locking the member 18 in its place when the parts are assembled, as will be readily understood.

The device is provided with braces 20 and 21 which are connected with the base 3 and the standard 1 by a screw-threaded bolt 22.

In operation, the shoe and calk to be welded together are placed on the head 5 when the lever 9 is depressed by the foot to bring the head 6 firmly downward upon head 5, thus forcing the heated shoe and calk together, thus welding the two parts into one. After this operation, the lever 9 is drawn upward by the action of the spring 17 thereby causing the link 12 to raise the movable head 6 back to its initial position when the same becomes ready for the second operation, and so on as many times as desired. The upward movement of the head 6 is limited by a shoulder 23 which engages the lower yoke 8, as will be readily understood.

What is claimed is:—

A foot power welding device, comprising a standard, a lever having a bifurcated end, said bifurcated end being pivotally connected to said standard, the upper part of said standard terminating at a head, a movable head adapted to coöperate therewith, said movable head being connected to the first named head by a plurality of yokes, a link connected with said lever and said movable head, said standard being provided with a recess adapted to receive a hook and to lock the same therewithin, a spring connected with said hook and said lever adapted to raise said lever for restoring the movable head to its initial position, and a shoulder formed on said head for limiting the upward movement of the movable head.

In testimony whereof we have signed our names to this specification in the presence of two subscribing witnesses.

HENRY HAMPTON GARVER.
GUY FRANKLIN BISSELL.

Witnesses:
IRA OTTO SNIDER,
CHAS. BAIRD.